United States Patent [19]
Wolf

[11] 3,740,104
[45] June 19, 1973

[54] FLUID BRAKE SYSTEM WITH SKID CONTROL

[76] Inventor: Lloyd J. Wolf, 2425 Irving Boulevard, Dallas, Tex. 75207

[22] Filed: Aug. 2, 1971

[21] Appl. No.: 168,014

[52] U.S. Cl. .......................................... 303/21 BB
[51] Int. Cl. .............................................. B60t 8/06
[58] Field of Search ............................. 188/181 C; 303/21 BB, 21 EB, 21 B, 21 BE, 21 F, 21 CF, 61-63, 68-69

[56] References Cited
UNITED STATES PATENTS

| | | |
|---|---|---|
| 2,423,057 | 6/1947 | Thomas et al. ................. 303/21 BB |
| 2,869,687 | 1/1959 | Keim et al. ...................... 303/21 BB |
| 2,937,051 | 5/1960 | Highley ........................... 303/21 BB |
| 3,004,801 | 10/1961 | Wrigley ............................ 303/21 BB |
| 3,264,039 | 8/1966 | Cadiou ............................. 303/21 BB |
| 3,264,040 | 8/1966 | Brueder .......................... 303/21 BB |

Primary Examiner—Milton Buchler
Assistant Examiner—D. C. Butler
Attorney—Bedell & Burgess

[57] ABSTRACT

A fluid brake system for automotive vehicles includes a skid control for releasing the brakes on any wheel when skidding of that wheel commences. The skid control comprises a fluid pressure-responsive normally open sensing valve in the fluid pressure line to each wheel brake cylinder, and constant displacement vacuum pumps driven respectively by the wheels with brakes and a wheel brakeless sensor, the pumps on the brake-mounting wheels being connected to the respetive sensing valves to urge the same toward open position, and the sensor wheel pump being connected to the sensing valves to close the same whenever the wheel whose brake is controlled by the respective valve commences to skid and suction produced by the respective valve commences to skid and substantially exceeds that produced by the wheel pump on the skidding wheel whereby to release the brake on the skidding wheel.

12 Claims, 3 Drawing Figures

INVENTOR:

LLOYD J. WOLF

INVENTOR:
LLOYD J. WOLF 3,740,104

FLUID BRAKE SYSTEM WITH SKID CONTROL

BACKGROUND OF THE INVENTION

1. Field of the Invention

The invention relates to fluid brake systems for vehicles and consists particularly in a fluid brake system incorporating skid control means.

2. The Prior Art

The closest approach in the prior art to the application system utilizes wheel pumps on all four wheels of a vehicle, compares the aggregate pressure from both sides with each other in a flow rate comparator, and connects an engine driven sump pump with a brake unloading cylinder which reduces pressure in the master cylinder as long as the imbalance continues.

In several patents the sensing is provided by a flywheel. In one of these a wheel-driven ring gear drives a flywheel, if a wheel skids, the ring gear stops turning and the flywheel moves clockwise on the ring gear, actuating a valve to vent a chamber permitting a valve to shut off air to the brake and vent the brake to atmosphere. Another of them utilizes a flywheel to control valve shutting off air to brake cylinder when skid starts. Still another utilizes a flywheel-type "accelerometer" driven by drive shaft to send fluid signal to first and second stage fluid amplifiers, whose output enters pressure modulator to modulate brake line pressure and release brake pressure when wheel slip occurs.

In another patent, a wheel driven pump is a bypass around a line from the master cylinder to the brake cylinder does not function if a wheel locks, hence does not return leaked fluid to the line and reduces brake pressure.

At present, some electrically controlled systems are commercially available. They include digital computers, solenoid valves and electronic wheel sensors and are quite complicated and correspondingly expensive.

SUMMARY OF THE INVENTION

The invention provides a simple, yet fully effective skid control means for fluid-operated vehicle brake systems. It utilizes a vacuum-actuated valve for each brake and constant displacement vacuum pumps driven respectively by each braked wheel and by one unbraked wheel, the latter as a sensor, for operating the valve. Moving parts are minimized, complex electrical circuitry and electronic elements are eliminated, and installation and maintenance costs are minimal.

Figure 1:
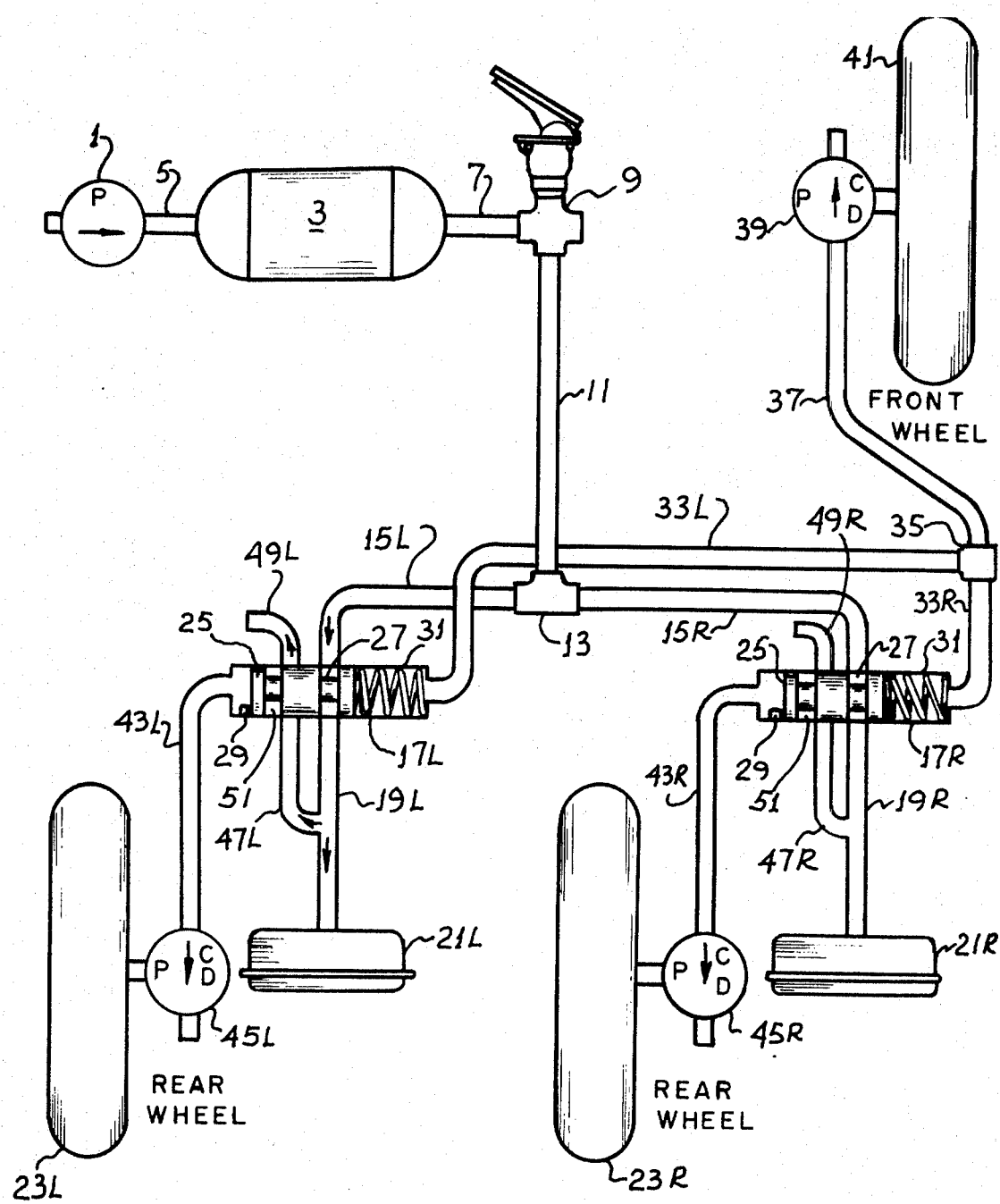
FIG. 1 is a schematic view of one embodiment of the invention.

DESCRIPTION OF THE PREFERRED EMBODIMENTS:

In the embodiment schematically illustrated in FIG. 1, the numeral 1 denotes a pump connected to reservoir 3 by conduit 5 to form a source of pressurized air, or other suitable fluid.

An outlet pipe 7 connects reservoir 3 to a normally closed pedal operated brake valve 9, which is connected by pipe 11, branched at 13, and branch pipes 15L and 15R to normally open sensing valves 17L and 17R, and through the latter via pipes 19L and 19R to brake cylinders 21L and 21R which control the brakes (not shown) on rear wheels 23L and 23R.

Except for the sensing valves 17L and 17R, the system described above corresponds to a conventional straight air brake system in which, the valve 9 is opened by depressing its pedal, permitting pressurized air to flow from reservoir 3, through the conduit comprising pipes 7, 11, 15L, 15R, 19L and 19R to cylinders 21L and 21R, which thereupon apply the brakes. When pressure on the pedal of valve 9 is released, the valve is returned into its normal position, closing communication between reservoir pipe 7 and pipe 11, and venting pipe 11 and cylinders 21L and 21R to the atmosphere to release the brakes.

To control skids, by releasing the brakes on rear wheels 23L and 23R, valves 17L and 17R are arranged to close whenever the related wheel commences to skid.

Each of the valves 17L and 17R which are identical comprises a chamber of elongated cylindrical shape in which is slidably mounted a spool 25 formed with an annular groove 27. A stop 29 is positioned in the valve chamber for abutting engagement with the left end of spool 25 when groove 27 is aligned with diametrically aligned pipes 15 and 19, and a coil spring 31 seated in the other end of the chamber bears against the right end of spool 25 to yieldably maintain the latter in engagement with stop 29 and groove 31 aligned with pipes 15 and 19.

To enable valves 17L and 17R to sense the occurrence of a skid, their right hand ends are connected respectively by pipes 33L and 33R which merge at 35 into pipe 37, which in turn leads to the inlet of a constant displacement vacuum pump 39, which is drivingly connected to brakeless front wheel 41, so that the magnitude of the vacuum produced by pump 39 is at all times directly proportional to the speed of wheel 41.

The left ends of valves 17L and 17R are connected respectively by pipes 43L and 43R to constant displacement vacuum pumps 45L and 45R, which in turn are respectively drivingly connected to rear wheels 23L and 23R, so that the vacuum produced by these pumps is directly proportional to the speed of the wheels by which they are driven, and, if a skid of either of braked wheels 23L or 23R commences, whereby the braked skidding wheel does not turn and the free sensing wheel 41 continues to turn, the vacuum produced by the latter, will draw spool 25 of the skidding wheel valve 17L to the right disaligning groove 27 with fluid conduits 15 and 19, and thereby cutting off the supply of pressurized fluid to the respective brake cylinders 45L or 45R.

In order to vent the brake cylinders when valves 17L or 17R are closed, pipe 19L and 19R are provided respectively with vent branches 47L and 47R which enter valves 17L and 17R at points spaced axially of the respective valves from conduits 19L and 19R, and the valves are provided with exhaust ports 49L and 49R aligned transversely of the respective valve with vent branches 47L and 47R, which are normally closed by spool 25. To provide venting of cylinders 21L and 21R when skidding commences, each spool 25 is formed with a second annular groove 51, normally disaligned from vent branch 47L or 47R, but positioned for alignment with the latter when grooves 27 are disaligned from pipes 15 and 19.

Operation of the system illustrated in FIG. 1 is as follows: As a vehicle so equipped moves along a road at, say 60 miles per hour, the angular velocity of the wheels 23L, 23R and 41 will be equal, and each of the wheel pumps 45L, 45R and 39 will displace, for example, 500 cc. of air. The driver applies the brakes by pedal actuation of valve 9, which permits air to pass from reservoir 3, through pipes 7, 11, 15L and 15R, valve spool grooves 27, and pipes 19L and 19R to the brake cylinders 21L and 21R. All wheels begin to decelerate, in that each wheel pump displaces 400 cc. of air. Suddenly the vehicle runs onto a patch of ice on the low side of the road and right rear wheel 23R locks and starts to slide, with the result that no air is displaced by right rear wheel pump 45R. At the same time, the brakeless front wheels and the left rear wheel continue to turn at road speed and their respective pumps continue to displace 400 cc. of air. When this condition occurs, there will be no suction applied to the left end of the spool 25 of right rear sensing valve 17R, while the suction produced by front wheel pump 39 will be applied to the right end of spool 25 in valve 17R, moving the spool to the right to close air inlet pipe 19R and open vent branch 47R to exhaust port 49R, thus causing brake cylinder 21R to release the right rear wheel brake. Since left rear wheel pump 45L is displacing the same volume of air as front wheel sensing pump 39, the position of spool 25 of left sensing valve 17L will remain unchanged, with air inlet groove 27 aligned with pipes 15L and 19L and exhaust groove 51 dialigned from vent branch 47L, to maintain the supply of pressurized air to left hand cylinder 21 and thereby keep the brake on left rear wheel 23L applied. As the speed of the right rear wheel increases after automatic release of its brake, as described above, to create a suction balance on both ends of spool 25 of right hand sensing valve 17R, spring 31 urges the spool to its normal position, opening the pressurized air passage, and closing the exhaust vent, to right rear wheel brake cylinder 21R, thereby reapplying the respective brake.

It will be understood that, although in each of the illustrated embodiments, a single pair of rear wheels is illustrated, the invention would be equally applicable to a tandem rear axle system or one having a greater number of axles, and that the sensor pump 39 might be drivingly connected to any brakeless wheel as well as to front wheel 41.

Figure 2:
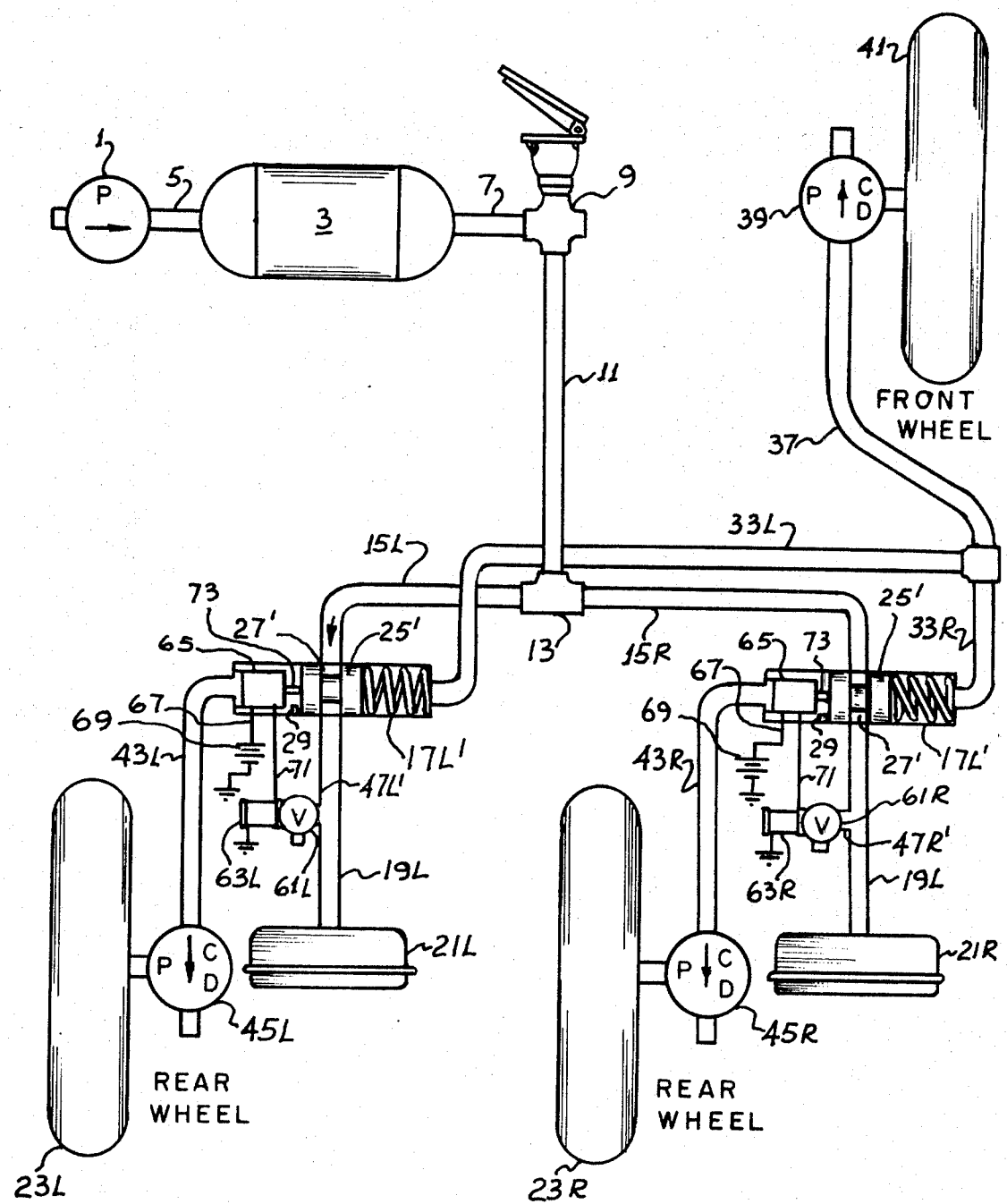
FIG. 2 is a schematic view of a modified form of the invention.

In the embodiment of the invention, schematically illustrated in FIG. 2, the basic system closely resembles that of FIG. 1, and the elements common to both systems are correspondingly numbered. Certain modified elements are denoted by corresponding numbers with a superscript ('). In the FIG. 2 embodiment modified sensing valves 17L' and 17R' and normally closed exhaust valves 61L and 61R in vent branches 47L' and 47R' of air pressure lines 19L and 19R are substituted for sensing valves 17L and 17R.

In each of the modified sensing valves 17L' and 17R', a single spool 25' has a single annular groove 27' forming a normally open passage between air pressure pipes 15L and 15R and 19L and 19R, venting of cylinders 21L and 21R being effected by normally closed exhaust valves 61L and 61R. The latter are operated by normally deenergized solenoids 63L and 63R. Normally open microswitches 65 are mounted in the left ends of sensing valves 17L' and 17R' and are connected by conduits 67 to a power source and by conductors 71 to solenoids 63L and 63R, and their outwardly biased operating plungers 73 engage the left end of valve spools 25' so as to close the switches when spools 23' move rightwardly to their closed positions. When this occurs, the respective solenoids 63L or 63R are energized, opening the associated exhaust valves 61L or 61R to vent the respective brake cylinder 21L or 21R and release the brake operated thereby.

Operation of the system illustrated in FIG. 2 is similar to that of the system of FIG. 1, except that venting of the brake cylinders 21L and 21R is effected by microswitches 65, solenoids 63L and 63R, and valves 61L and 61R, responsive to closing movements of sensing valve spools 25'.

Figure 3:
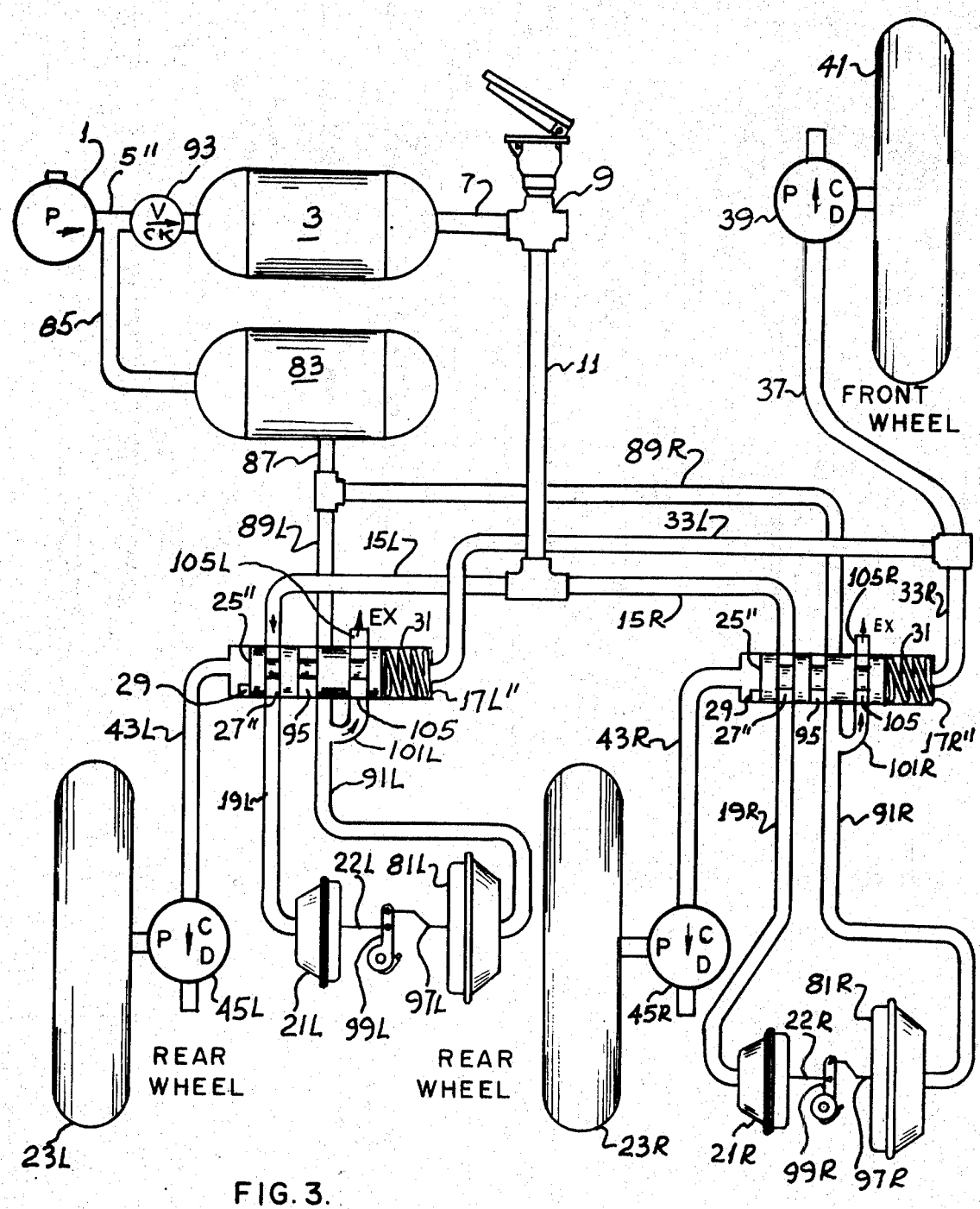
FIG. 3 is a schematic view of modified form of the invention.

In the embodiment schematically illustrated in FIG. 3, the basic system closely resembles that of FIG. 1, and the elements common to both systems are correspondingly numbered. Certain modified elements are denoted by corresponding numbers with a superscript (''). In the embodiment of FIG. 3, in order to avoid pressure loss in the basic system resulting from the necessity of venting the brake cylinders to release the brakes when skidding commences, release of the brakes under such conditions is effected by larger override cylinders 81L and 81R arranged to act in opposition to and overpower brake cylinders 21L and 21R.

For actuating override cylinders 81L and 81R, a separate reservoir 83 is connected to air pump 1 by pipe 85, and reservoir 83 is connected to modified sensing valves 17L'' and 17R'' by pipes 87 and 89L and 89R respectively. Pipes 91L and 91R, aligned respectively with pipes 89L and 89R connect valves 17L'' and 17R'' respectively with override cylinders 81L and 81R. In order to isolate the override system including reservoir 83 and override cylinders 81L and 81R from the main reservoir 3 in the latter, a check valve 93 is located at the inlet to reservoir 3 in pipe 5'' leading from the air pump to reservoir 3.

Each of the modified sensing valves 17L'' and 17R'' includes a sliding spool 25'' biased leftward toward stop 29 by spring 31. Each spool 25'' is formed with an annular groove 27'' normally aligned with main air pipes 15L and 19L or 15R and 19R, a second annular groove 95 spaced axially of the spool from groove 27'' and positioned to be disaligned from aligned override pipes 89L and 91L or 89R and 91R when groove 27'' is open and to be aligned with pipes 89L and 91L or 89R and 91R when groove 27'' is closed. Thus, when skid conditions occur the pressure differential on opposite ends of spool 25'' resulting from the absence of vacuum from pumps 45L or 45R will cause the spool to move to the right, disaligning groove 27'' from main pressure pipes 15L and 19L or 15R and 19R so as to shut off air to brake cylinders 21L or 21R, and aligning groove 95 with override pressure pipes 89L and 91L or 89R and 91R to introduce air into override cylinders 81L or 81R. The latter are connected by their pushrods 97L and 97R respectively to brake application arms 99L and 99R, outwardly thereof from the connections thereto of brake cylinder pushrods 22L and 22R, so that the longer arm through which the override cylinders 81L and 81R act on the brake application arms 99L and 99R, combined with the larger effective areas of the override cylinders, have an overpowering effect on brake cylinders 21L AND 21R, forcing the respective brake application arms counterclockwise and releasing the respective brake, without requiring venting of the respective brake cylinders. When the affected rear wheel begins to turn and its pump 45L or 45R reaches the same speed and displaces the same amount of air as sensing pump 39, the pressure equilibrium in the respective sensing valve 17L'' or 17R'' will permit spring 31 to return spool 25'' leftward against stop 31, opening brake cylinder supply pipes 15L, 19L, or 15R, 19R and closing override cylinder supply pipes 89L, 91L or 89R, 91R. For effecting simultaneous release of the respective override cylinder, their supply pipes 91L and 91R are formed with vent branches 101L and 101R which intersect sensing valves 17L'' and 17R'' at points axially spaced from the intersection of pipes 19L and 91R and valves 17L'' and 17R'' are provided with exhaust outlets 105L and 105R transversely aligned with vent branches and 19R and 91R. Each spool 25'' is formed with a third annular groove 105, normally aligned with vent branches 101L and 101R and exhaust outlets 105L and 105R when grooves 27'' are opened and grooves 95 are closed and vice versa. Thus, when spool 25'' is returned to its normal position by spring 31, groove 105 is aligned with vent branch 101L or 101R and exhaust outlet 105L or 105R and vent override cylinders 81L or 81R to permit its release.

Operation of the system illustrated in FIG. 3 is generally similar to that of the system of FIG. 1 and FIG. 2 except that when pressure differential in the right hand sensing valve 17R'' causes its spool 25'' to move to the right, closing the brake cylinder air pipes 15R, 19R, the latter is not vented and continuing air loss due to venting is avoided. Instead, groove 95 becomes aligned with override system air pipes 89R and 91R and groove 105 becomes disaligned from vent branch 101R and exhaust outlet 105R, causing air from override reservoir 83 to pass into override cylinder 81R, which overpowers brake cylinder 21R, releasing the right rear wheel brake. As the freed right rear wheel begins to approach the speed of the right front sensor wheel, the right rear wheel pump 45R begins to displace the same volume of air as sensing pump 39, the resulting pressure equilibrium in sensing valve 17R'' permits spring 31 to move spool 25'' leftward against stop 29, opening the air supply through groove 27'' to brake cylinder 21R, closing the air supply through groove 95 to override cylinder 81R, and venting the latter through groove 105, thus reapplying the brake on the right rear wheel. It will be observed that, since the brake cylinder 21R was not vented during the skid control period, and since the override system was isolated by check valve 93 from the brake system main reservoir, pressure in the latter would not be depleted if the brake cylinder itself were vented through the sensing valve to effect release of the brakes.

It will be understood that the sensing pump can be driven by any brakeless wheel as well as the illustrated front wheel 41; for example, if applied to a semi-trailer, with no front wheels, a small spring-loaded idler wheel, mounted between the trailer rear wheel could be provided to drive the sensing pump.

Details of the system may be varied substantially without departing from the spirit of invention and the exclusive use of those modifications as come within the scope of the appended claims is contemplated.

I claim:

1. In a fluid brake system for vehicles, ground-engaging wheels including a wheel equipped with a brake and a free-running wheel, said brake having fluid pressure-actuating means, a source of fluid under pressure, pressure conduit means connecting said source with said actuating means, a normally closed control valve in said conduit means for admitting fluid to and exhausting fluid pressure from said pressure-actuating means, a normally open sensing valve in said conduit means, wheel speed-responsive sensing valve control means connecting said sensing valve respectively to said free-running wheel and said brake-equipped wheel and arranged to close said sensing valve when said free-running wheel speed exceeds that of said brake-equipped wheel and thereby interrupt the flow of fluid to the associated brake-actuating means, a second source of fluid under pressure, pressure-responsive override means connected to said brake for overpoweringly opposing said brake-actuating means and releasing said brake responsive to fluid pressure in said override means, override conduit means connecting said second fluid source and said override means and including a normally closed valve openable responsive to closure of said sensing valve for providing communication between said second fluid source and said override means.

2. In a fluid brake system according to claim 1, a normally open exhuast valve communicating with said last-named conduit means posterior to said normally closed valve, said exhaust being closable responsive to opening of said normally closed valve.

3. In a fluid brake system according to claim 2, said brake including a brake application arm, said brake-actuating means comprising a cylinder having a push rod connected to said application arm, said override means comprising a cylinder having a push rod connected to said application arm to move the latter in the opposite direction from its brake-application direction.

4. In a fluid brake system according to claim 3, said override cylinder being more powerful than the respective brake-actuating cylinder whereby when energized to overpower the latter.

5. In a fluid brake system according to claim 3, said override cylinder push rod being connected to said application arm radially outwardly of the connection thereto of said brake actuation cylinder push rod.

7. In a fluid brake system according to claim 6, said sensing valve comprising a cylindrical chamber intersecting said pressure conduit means and a spool axially slidable in said chamber, said spool having an annular groove normally aligned with said pressure conduit means, a spring biasing said spool toward its normal position, one end of said chamber being connected to said first pump and the other end of said chamber being connected to said sensor pump whereby pressure differential between said pumps opposes said spring and moves said spool to disalign said groove from said pressure conduit means.

8. In a fluid brake system according to claim 7, said override conduit means transversely intersecting said sensing valve chamber at points spaced axially thereof from said brake-actuating pressure conduit means, said valve spool having a second annular groove normally disaligned from said override conduit means when said first groove is aligned with said brake-actuating conduit means, said second annular groove being aligned with said override conduit means when said first annular groove is disaligned from said brake-actuating conduit means.

9. In a fluid brake system according to claim 8, each of said override conduit means having normally open vent closeable responsive to registry of said second annular groove with said override pressure conduit means.

10. In a fluid brake system according to claim 9, said vent including a passage transversely intersecting said sensing valve chamber at points spaced axially thereof from said brake-actuating and override conduit means, said spool having a third annular groove normally in registry with said vent passage, and disaligned therefrom when said first and second annular grooves are disaligned and aligned with said brake-actuating and override conduit means respectively.

11. In a fluid brake system according to claim 6, said constant displacement pumps being vacuum pumps whereby said sensing valves close the respective brake-actuating pressure conduit when the vacuum produced by said first vacuum pump falls below that produced by the sensor pump.

12. In a fluid brake system according to claim 7, said constant displacement pumps being vacuum pumps, the end of said chamber toward which said spring braces said spool being connected by said first conduit to said first vacuum pump, and the other end of said chamber being connected by said second conduit to said sensor vacuum pump, whereby, when said vacuum produced by said first vacuum pump falls below that produced by said sensor pump, the latter vacuum overcomes said spring and moves said spool to disalign said groove from said brake-actuating conduit means.

\* \* \* \* \*